United States Patent
Ring

(10) Patent No.: US 10,077,582 B2
(45) Date of Patent: Sep. 18, 2018

(54) AUTOMATIC CHILD SAFETY LOCK RELEASE

(71) Applicant: Mark Ring, Houston, TX (US)

(72) Inventor: Mark Ring, Houston, TX (US)

( * ) Notice: Subject to any disclaimer, the term of this patent is extended or adjusted under 35 U.S.C. 154(b) by 14 days.

(21) Appl. No.: 15/214,759

(22) Filed: Jul. 20, 2016

(65) Prior Publication Data

US 2017/0370129 A1 Dec. 28, 2017

Related U.S. Application Data

(60) Provisional application No. 62/353,359, filed on Jun. 22, 2016.

(51) Int. Cl.

| | | |
|---|---|---|
| *E05B 77/22* | (2014.01) | |
| *E05B 77/26* | (2014.01) | |
| *E05B 81/58* | (2014.01) | |
| *G07C 5/08* | (2006.01) | |
| *E05F 15/71* | (2015.01) | |
| *B60Q 9/00* | (2006.01) | |

(52) U.S. Cl.
CPC ............... *E05B 77/22* (2013.01); *B60Q 9/00* (2013.01); *E05B 77/26* (2013.01); *E05B 81/58* (2013.01); *E05B 81/77* (2013.01); *E05F 15/71* (2015.01); *G07C 5/0841* (2013.01)

(58) Field of Classification Search
CPC .......... E05B 77/22; E05B 77/24; E05B 77/26
See application file for complete search history.

(56) References Cited

U.S. PATENT DOCUMENTS

| | | |
|---|---|---|
| 5,574,315 A | 11/1996 | Weber |
| 5,894,906 A | 4/1999 | Weber |
| 5,975,231 A | 11/1999 | Hirato |
| 6,081,758 A | 6/2000 | Parvulescu |
| 6,157,090 A | 12/2000 | Vogel et al. |
| 6,206,452 B1 | 3/2001 | Talbot |
| 6,263,272 B1 | 7/2001 | Liu et al. |
| 6,577,228 B1 | 6/2003 | Tsuchida et al. |
| 6,922,622 B2 | 7/2005 | Dulin et al. |
| 7,064,456 B2 | 6/2006 | Hirota et al. |
| 7,170,401 B1 * | 1/2007 | Cole ...................... B60N 2/002 340/439 |
| 7,218,211 B2 | 5/2007 | Ho et al. |
| 7,352,081 B2 | 8/2008 | Taurasi |
| 7,770,326 B2 | 8/2010 | Al-Qassem |
| 8,710,972 B2 | 4/2014 | Son |
| 9,334,681 B2 | 5/2016 | Fernandez-Aguilera et al. |
| 2008/0103660 A1 * | 5/2008 | Browne ............. B60R 25/1004 701/46 |
| 2012/0280791 A1 * | 11/2012 | Kim ....................... B60R 25/24 340/5.72 |

\* cited by examiner

*Primary Examiner* — Anshul Sood
(74) *Attorney, Agent, or Firm* — Sarah J. Ring; The Ring Law Firm, PLLC

(57) ABSTRACT

An automated child safety unlocking system which disengages the child safety locks and may unlock the vehicle door in appropriate circumstances such as when the vehicle ignition has been turned to the off position or when engine is stopped. The automated child safety unlocking system enables operability of the interior vehicle doors by an occupant to allow unencumbered egress from the vehicle to prevent a child or other individual from being trapped in the vehicle. The result is reduced risk that children or other vehicle occupants become dangerously entrapped within an overly hot, cold, or dangerous vehicle.

16 Claims, 11 Drawing Sheets

AUTOMATIC CHILD SAFETY LOCK RELEASE

CROSS REFERENCE TO RELATED APPLICATION

This application claims priority to and all the benefits of U.S. Provisional Application Ser. No. 62/353,359, filed on Jun. 22, 2016 and entitled "Automatic Child Safety Lock and Window Release."

FIELD OF THE INVENTION

The present invention relates to aiding the escape of vehicle occupants to the outside of a vehicle in the event that the occupant becomes trapped.

BACKGROUND OF THE INVENTION

Child safety locks in motor vehicles are well known in the art. The purpose of child safety locks is to prevent a child from opening a vehicle door during vehicle operation. While child safety locks protect children during normal operation of a vehicle they can produce a potentially dangerous situation. For example, if the child safety locks are engaged on an vehicle and a child enters a vehicle to play on a hot day, the child can become trapped in the vehicle without a way to exit. In particularly hot climates, children have been known to become trapped in hot cars and to very quickly die due to extremely hot temperatures inside the car.

Just recently, a three-year-old child in Houston, Tex. died from the internal heat of the vehicle after the child escaped the front door of his home in search of a toy in the backseat of his parent's vehicle. The child entered the vehicle, and the door closed behind him. It is believed the child attempted to open the door using the handles in the back seat of the vehicle but was unable to escape due to the child lock feature of the vehicle. The child died as a result of the temperature inside the vehicle and his inability to escape.

Problems of this nature have been recognized in the past but have failed to solve the safety issue. For example, U.S. Pat. No. 7,770,326 to Al-Qassem discloses a safety door, door lock, and door lock release mechanism for preventing a child from opening the door while permitting an adult to do so. As disclosed the system denies access to a child based upon a switch out of the reach of a child or alternatively a height sensor that would allow access to an adult but not the child. The disclosed also contains an alarm which would unlock the doors of a vehicle in the event that an unsafe situation such as smoke, or carbon monoxide is detected, said alarm also being audible.

Another patent, U.S. Pat. No. 6,081,758 to Parcvuescu discloses a system for automatically unlocking an automobile child safety door lock. As disclosed, the system includes an emergency sensor such as a collision sensor initiating an airbag deployment, a door lock mechanism, and a door lock releasing mechanism. Upon the sensor detecting an emergency, the sensor produces a signal that is sent to the door lock releasing mechanism, which subsequently unlocks the doors of the vehicle. The sensor may also trigger disconnection of the battery terminal and interruption of the fuel line from the fuel tank to the engine. The emergency sensor may alternatively include a temperature or smoke sensor.

U.S. Pat. No. 6,206,452 to Talbot discloses a vehicle having an automatic child lock function that is controlled by an electronic control system. The electronic control system receives signals from weight sensors in the base of each passenger seat. The findings from the sensors are used to determine the occupancy of the vehicle and to produce a signal indicative of the weight of each passenger. The electronic control system is programmed to operate such that if the signal received from the particular sensor indicates a passenger is below a predetermined weight, thereby indicating the presence of a child, the associated door is prevented from being opened from a closed position even when an interior door handle is operated by a passenger.

None of the above mentioned patents adequately address the dangers of an unsupervised child becoming trapped in a vehicle without the knowledge of an adult or other responsible party.

None of the above mentioned patents address releasing the child lock mechanism automatically every time an automobile is turned off, disabled, or left unattended for a predetermined amount of time.

Therefore, it is believed that there is a need and a large commercial market for a safety door lock release mechanism in accordance with the present invention. The market is present as there is not a simple, reliable, and affordable method of preventing children from becoming trapped in a vehicle currently available.

It is thought that a system in accordance with the present invention can be adapted to current designs, and sold at a very reasonable price to vehicle manufacturers around the world looking to improve the safety of their vehicles.

SUMMARY OF THE INVENTION

The present invention relates to an automated child safety unlocking system for automobiles which disengages the child safety locks at appropriate times, such as when the ignition is turned to the off position, when the engine is turned off or when the interior of the car reaches a particular temperature threshold.

The present invention can operate in several different ways depending upon the desire of the vehicle manufacturer. In one embodiment the present invention is intended to release the child lock mechanism and allow exit from the vehicle without actually unlocking the vehicle from the outside. By releasing only the child lock, any passenger would be able to escape the vehicle without adding any risk that unauthorized access from the outside may occur. The child lock mechanism could automatically reengage the next time the car is started. The present invention is also intended to unlock the interior exterior door locks in the event that motion is detected on the inside of the car or a human hand touches the interior door handle. These conditions could be combined with a temperature sensor detecting an unreasonably high or low temperature in the interior of the vehicle.

In another embodiment of this invention the child lock mechanism may be automatically released at a predetermined time (manufacturer's choice) after the vehicle ignition has been turned off. The car door will remain locked from the outside of the car, but the child lock mechanism will be automatically released at said predetermined time after the ignition has been turned off. The child lock mechanism could also automatically release upon the vehicle ignition being turned off. This would eliminate the need for a timer.

In another embodiment of this invention the child lock mechanism will automatically release if a key fob or other wireless device travels a predetermined distance from the vehicle and the vehicle ignition has been turned off. Again, the car door could remain locked from the outside, but the child lock mechanism could be automatically released to allow for a trapped child to exit the vehicle.

In another embodiment of this invention the child lock mechanism will automatically release if the vehicle ignition has turned off and a motion is detected in the interior of the vehicle or a human hand touches the interior door handle. In this embodiment, the child lock may be disabled or the door could become unlocked on both the interior and exterior so that a responsible individual could release a trapped person from the exterior of the car.

In another embodiment of this invention the child lock mechanism will automatically release if the vehicle ignition has turned off and a motion sensor senses motion on the interior of the vehicle. In this embodiment, the child lock may be disabled or the door could become unlocked on both the interior and exterior so that a responsible individual could release a trapped person from the exterior of the car.

Any of the embodiments described herein may also be combined with an interior vehicle thermometer. In this embodiment, the release of the child lock or the unlocking of the doors would occur only in the event that the interior temperature of the car became extremely high of low.

Another embodiment of this invention could provide any or all of the above described features of the invention combined. For example, the present invention envisions that the child lock mechanism could be automatically released at a predetermined time after the ignition is turned off AND the key fob reaches a predetermined distance from the vehicle.

Another embodiment of this invention could provide any or all of the above described features of the invention combined with an electronic override switch which would temporarily extend, for one on/off cycle of the vehicle's ignition, the duration of time between turning off the vehicle and releasing the child lock.

Another embodiment of this invention could provide any or all of the above described features of the invention combined with an audible, visible, or audible and visible message from the vehicle or from a wireless or mobile device telling any occupant that the child locks have been disabled.

Another embodiment of this invention could provide any or all of the above described features of the invention combined with a temperature, weight, Carbon Monoxide, CO2, smoke, motion, or other sensor which would disable the child lock and sound and audible alarm such as the horn in the event that danger is detected and the sensor detects that a person is occupying the vehicle.

In another embodiment of the present invention, any of the above-mentioned conditions or combinations of conditions could command that the vehicle's automatic windows be rolled down upon certain conditions. For example, if the ignition is turned off, the temperature of the interior of the car becomes unreasonably high, and a human hand touches the interior door handle, then one or more windows would be automatically rolled down in order to relieve the high temperature condition.

DETAIL DESCRIPTION OF THE INVENTION

The following description of the preferred embodiment(s) is merely exemplary in nature and is in no way intended to limit the invention, its application, or uses. The specific embodiments describing how this may be achieved are not intended to limit the scope of this invention to those embodiments.

FIGS. 1-11 illustrate the key elements of the automatic child safety lock release system. These safety features could be incorporated on many different items other than a vehicle, such as a tractor walk in cooler, refrigerator, or other confined space where a safety door lock is present.

Figure 1:
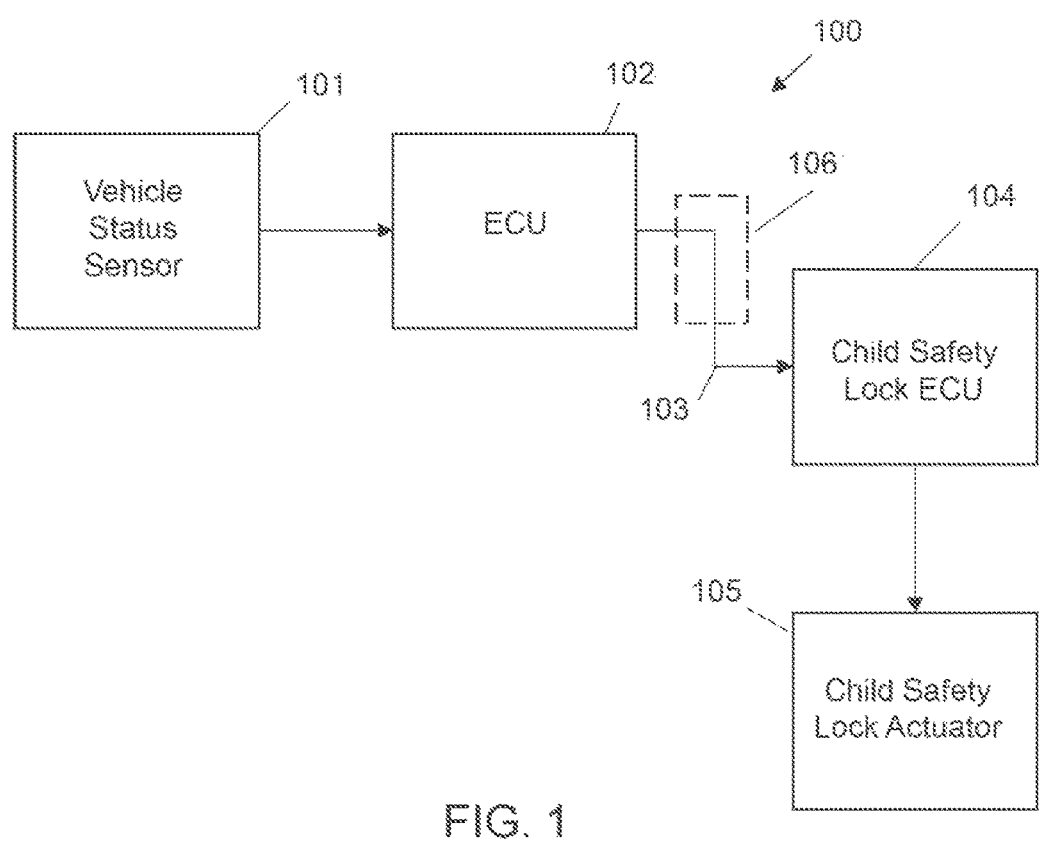
FIG. 1 is a general schematic diagram of an automated child safety unlocking system in accordance with one embodiment of the invention.

Referring now to FIG. 1, a schematic diagram of an automated child safety unlocking system 100 is shown. The child safety unlocking system 100 may use a vehicle status sensor 101 such as the ignition status sensor disclosed in U.S. Pat. No. 9,311,616 to determine the status of the ignition. Other types of vehicle status sensors 101 may be used to determine the status of the ignition or engine. For example, a crank shaft position sensor may be used to determine whether the vehicle engine is in operation. In operation, when the vehicle ignition is turned off or disabled, the vehicle status sensor 101 generates a signal to a control device like an electronic control unit ("ECU") 102 that is configured to receive a vehicle status signal from the vehicle status sensor 101. This control unit may be similar to the control unit (75) disclosed in U.S. Pat. No. 7,352,081 to Taurasi. In response to receiving a vehicle status signal from the vehicle status sensor 101, the ECU 102 is then configured to transmit a child safety lock command signal 103. The child safety lock command signals 103 may be generated by the ECU 102 and transmitted to a separate control unit, child safety lock ECU 104. The child safety lock ECU 104 then may selectively disengage a child safety lock actuator 105 in response to the child safety lock command signal 103 received by the child safety lock ECU 104. Disengagement of the child safety lock actuator 105 means that the child safety features are disengaged so that the door can be opened by anyone inside the vehicle. Release of the child safety lock does not unlock the door to the car from the outside. It should be noted that child safety lock actuator 105 may be a solenoid, motor, or any other actuator known in the art to release a child safety lock.

The transmission of the child safety lock command signal 103 to the child safety lock ECU 104 may be done by an independent communication bus directly coupled to the child safety lock ECU 104 or the ECU 102 may transmit the child safety lock command signal 103 as part of the general signals over a general vehicle communication bus 106.

Figure 2:
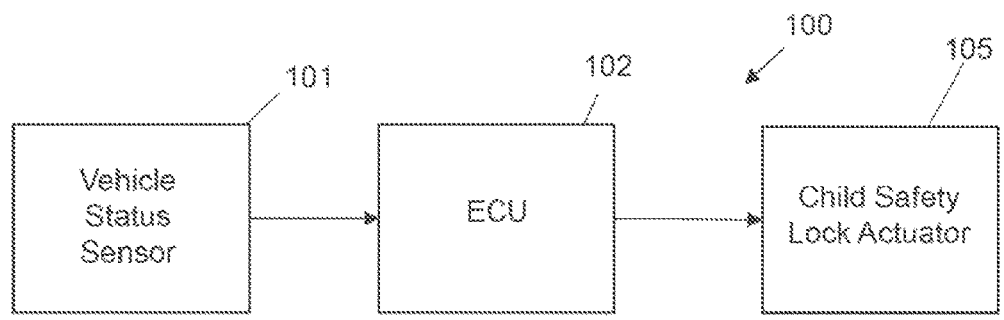
FIG. 2 is a general schematic diagram of an automated child safety unlocking system in accordance with one embodiment of the invention.

It should also be appreciated that a vehicle status sensor 101 signal could be transmitted to an ECU 102 and the child safety lock actuator 105 could be actuated by that ECU 102. This would bypass the need for a separate child safety lock ECU 104. This is shown in FIG. 2.

The ECU'S 102, 104 may be configured to receive the general signals transmitted through the general vehicle communication bus 106. The ECU'S 102, 104 may filter the child safety lock signals 103 from the general vehicle communication bus 106.

The engagement or disengagement of the child safety lock actuator 105 may be controlled by the child safety lock ECU 104. The child safety lock ECU 104 may be configurable to adjust the amount of time before the child safety lock ECU 104 disengages the child safety lock actuator 105. The amount of delay or action to be taken by the child safety lock ECU 104 is all pre-programmable onto the child safety lock ECU 104 and can be changed or adjusted. It is also envisioned that any of the ECUs may be configurable to adjust the amount of time before it disengages the child safety lock actuator 105.

The communication between the ECU 102 and the child safety lock ECU 104 (or any communication amongst the various control systems described herein) may be accomplished by one or a combination of the following types of communication: Digital (e.g., Controller Area Network ("CAN"), Flex-ray, Local Interconnect Network ("LIN"), Kline, etc.), Analog (based on exceeding an analog threshold in the signal (positive or negative slopes); Analog PWM (based on an analog PWM signal).

It should further be appreciated that the child safety unlocking system 100 may use an "operation detecting part" to detect the operation of the ignition switch as disclosed in U.S. Pat. No. 6,577,228. As disclosed in U.S. Pat. No. 6,577,228, various sensors for detecting various operations or conditions of the vehicle may supply signals to an ECU, which can then send signals to control various operations within the vehicle in response to these signals. A memory may also be connected to an ECU and contain a plurality of different codes therein such as a first code for disengaging the child safety lock and a second code for unlocking the rear doors. The memory may be a non-volatile memory such as EEPROM so that the contents stored in the memory are maintained if power supply to the memory is shut off.

In another embodiment, the child safety lock actuator 105 could be disengaged upon the vehicle engine ceasing operation instead of the vehicle ignition being turned off. It is further envisioned that the child safety lock actuator 105 could be disengaged upon the powertrain control module (PCM), ECU 102 or other vehicle computer being powered off. In an alternative embodiment, it is envisioned that the child safety lock actuator 105 could be disengaged by a relay attached directly to the ignition.

Figure 3:
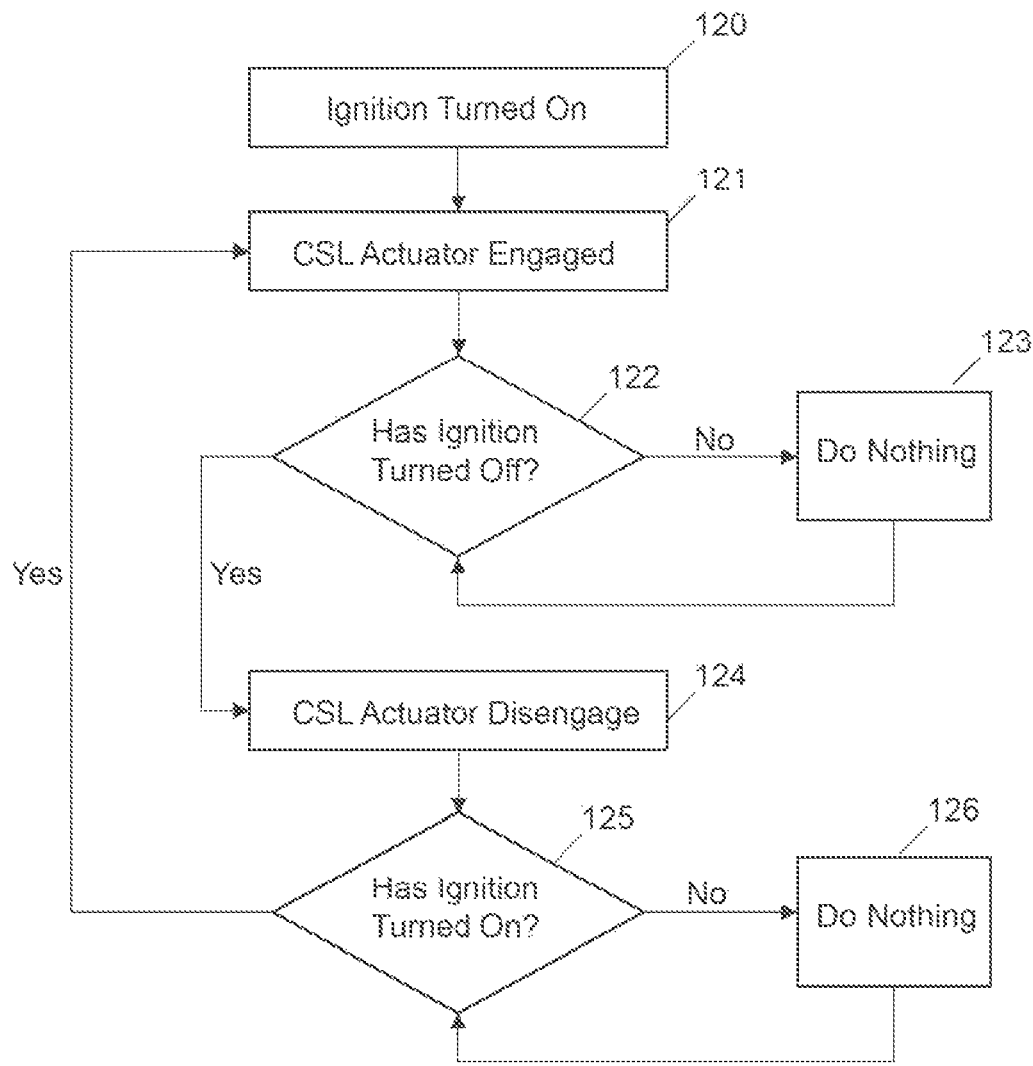
FIG. 3 is a box diagram of an automated child safety unlocking system in accordance with the present invention.

FIG. 3 is a decision box diagram showing more details concerning an operational routine of the invention. Upon a vehicle turn on step 120, the vehicle ignition is turned on and the child safety lock actuator 105 is engaged 121. At decision step 122 "Has Ignition Turned Off," the system determines if the ignition has been turned off. This determination may be made by an ECU as described above. If at decision step 122 it is determined that the ignition has not been turned off, then the child safety lock ECU or other control unit will move to a "do nothing" step 123 and take no action to disengage the child safety lock actuator. The system will continue to cycle back to the decision step 122 at programmed intervals or upon receipt of more information by the electronic control system until at the decision step 122 a determination that the ignition has turned off. If the system determines that the ignition has turned off, then at step 124, the child safety lock actuator is commanded to disengage. After the child safety lock actuator is disengaged, at decision step 125 "Has Ignition Turned ON," the system determines if the ignition has been turned on. This determination may be made by an ECU as described above. If at decision step 125 it is determined that the ignition has not been turned on, then the child safety lock ECU or other control unit will move to a "do nothing" step 126 and take no action to engage the child safety lock actuator. The system will continue to cycle back to the decision step 125 at programmed intervals or upon receipt of more information by the electronic control system until at the decision step 125 a determination that the ignition has turned on. If the system determines that the ignition has turned on, then at step 121, the child safety lock actuator is commanded to engage. This final step automatically re-activates the child safety lock when the ignition or engine is turned back on.

Figure 4:
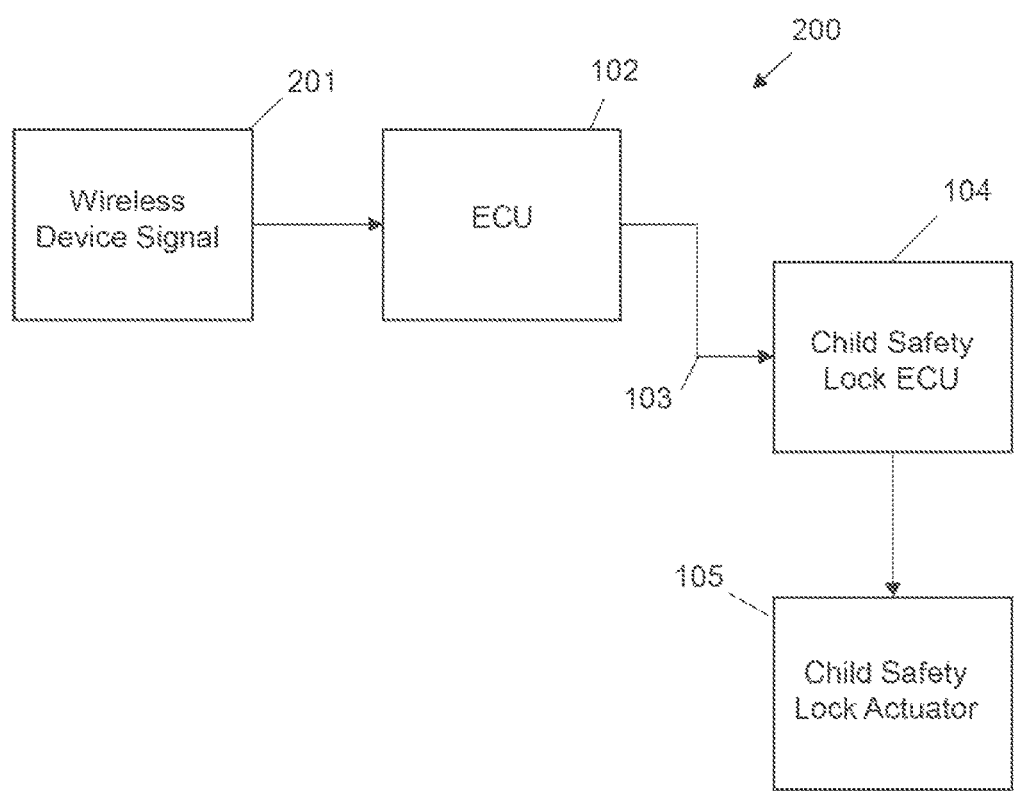
FIG. 4 is a general schematic diagram of an automated child safety unlocking system in accordance with one embodiment of the invention.

Referring now to FIG. 4, a schematic diagram of an automated child safety unlocking system 200 is shown. The child safety unlocking system 200 may use a wireless key, FOB, or other wireless device. When the wireless device travels a predetermined distance from the vehicle, the wireless device uses a signal generation unit to generate a signal 201 that would cause the child safety lock actuator 105 to disengage. The signal generation may be accomplished using a signal generation unit, signal response unit and signal analysis unit using near field communications such as radio-frequency identification (RFID) technology, Bluetooth, or infrared ray communications as disclosed in U.S. Pat. No. 8,710,972.

Figure 5:
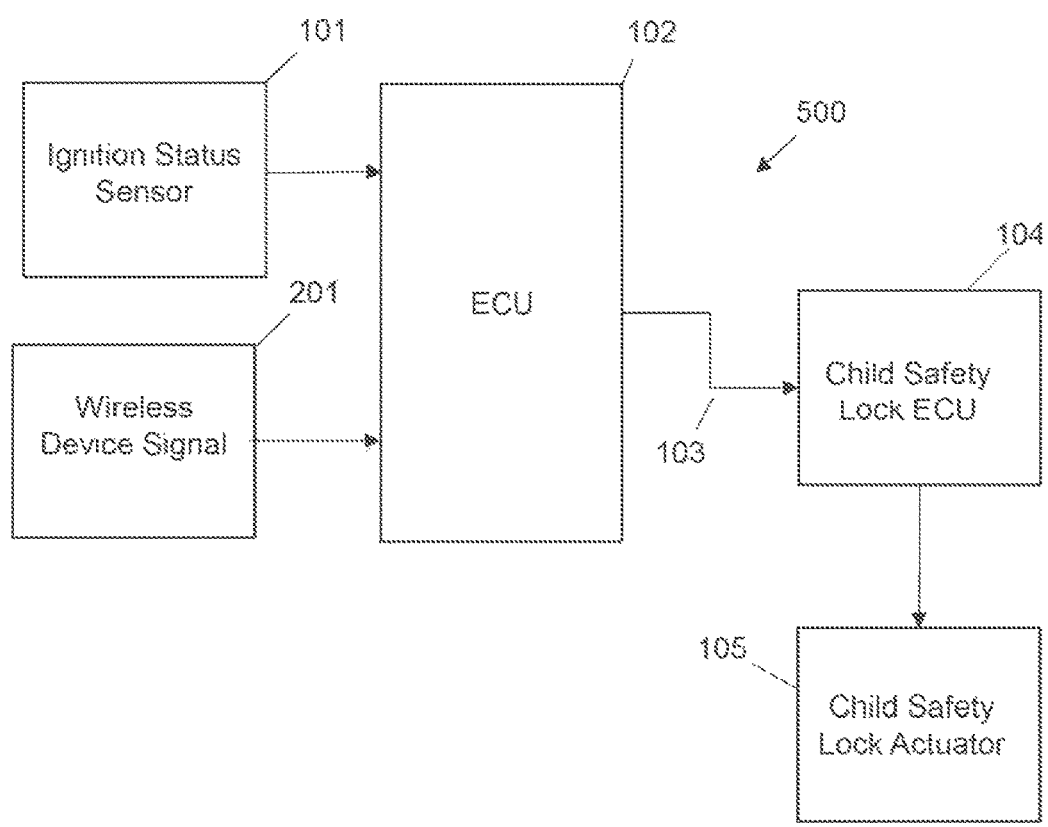
FIG. 5 is a general schematic diagram of an automated child safety unlocking system in accordance with one embodiment of the invention.

It is also envisioned that the child safety lock actuator 105 could automatically disengage when both of the following conditions exist: (a) the wireless mechanism travels a predetermined distance from the vehicle AND (b) the vehicle ignition has turned off. This system 500 is shown in FIG. 5.

Figure 6:
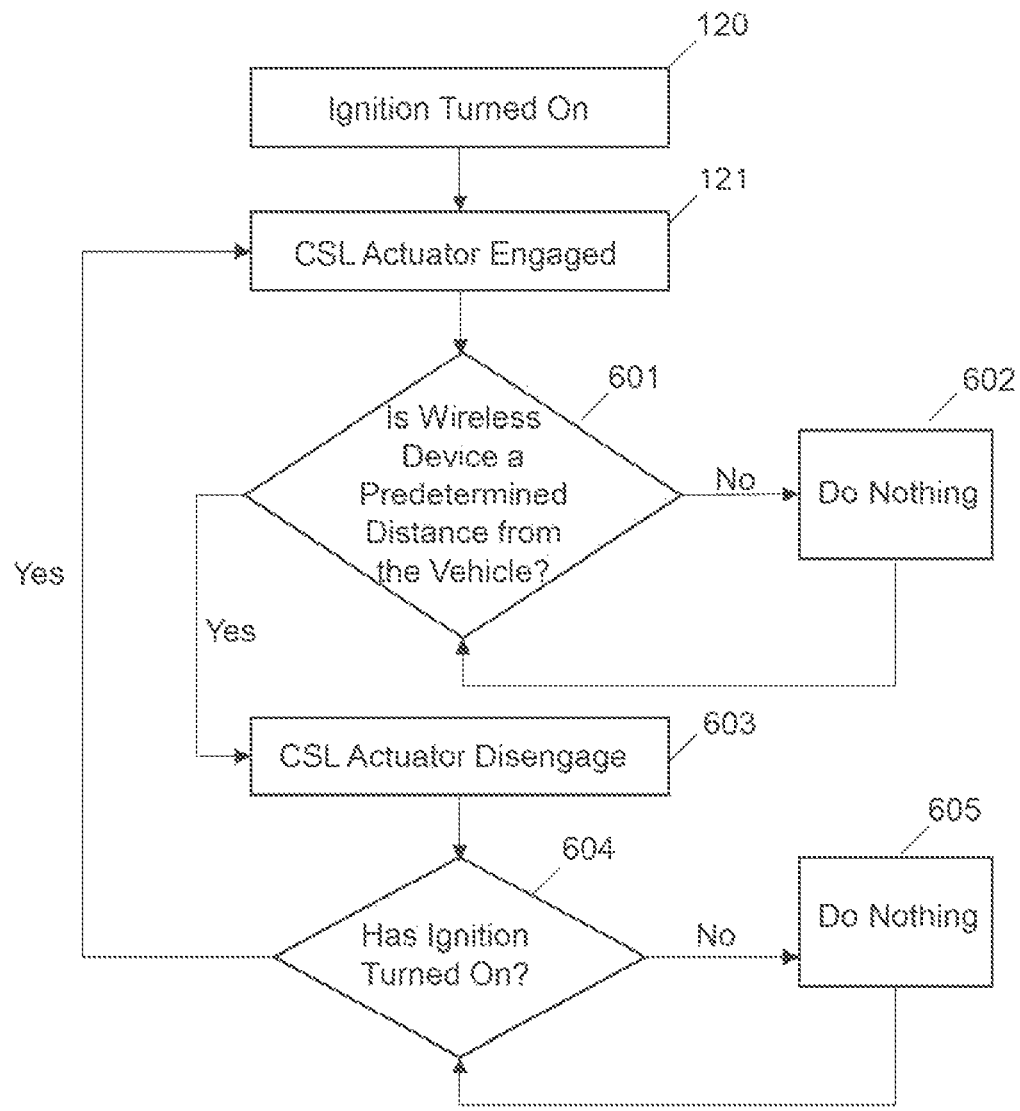
FIG. 6 is a decision box diagram of an automated child safety unlocking system in accordance with the present invention.

Referring now to FIG. 6, a decision box diagram showing details concerning an operation routine of the system 200 is shown. Upon a vehicle turn on step 120, the vehicle ignition is turned on and the child safety lock actuator 105 is engaged 121. At decision step 601 "Is Wireless Device a Predetermined Distance from the Vehicle," the system determines if the wireless device has traveled a predetermined distance from the vehicle. If at decision step 601 it is determined that the wireless device has not traveled a predetermined distance from the vehicle, then the child safety lock ECU or other control unit will move to a "do nothing" step 602 and take no action to disengage the child safety lock actuator. The system will continue to cycle back to the decision step 601 at programmed intervals or upon receipt of more information by the electronic control system until at decision step 601 a determination that the wireless device has traveled a predetermined distance from the vehicle. If the system determines that the wireless device has traveled a predetermined distance from the vehicle, then at step 603, the child safety lock actuator is commanded to disengage. After the child safety lock actuator is disengaged, at decision step 604

"Has Ignition Turned ON," the system determines if the ignition has been turned on. This determination may be made by an ECU as describe above. If at decision step 604 it is determined that the ignition has not been turned on, then the child safety lock ECU or other control unit will move to a "do nothing" step 605 and take no action to engage the child safety lock actuator. The system will continue to cycle back to step 604 at programmed intervals or upon receipt of more information by the electronic control system until at the step 604 a determination that the ignition has turned on. If the system determines that the ignition has turned on, then at step 121, the child safety lock actuator is commanded to engage.

Figure 7:
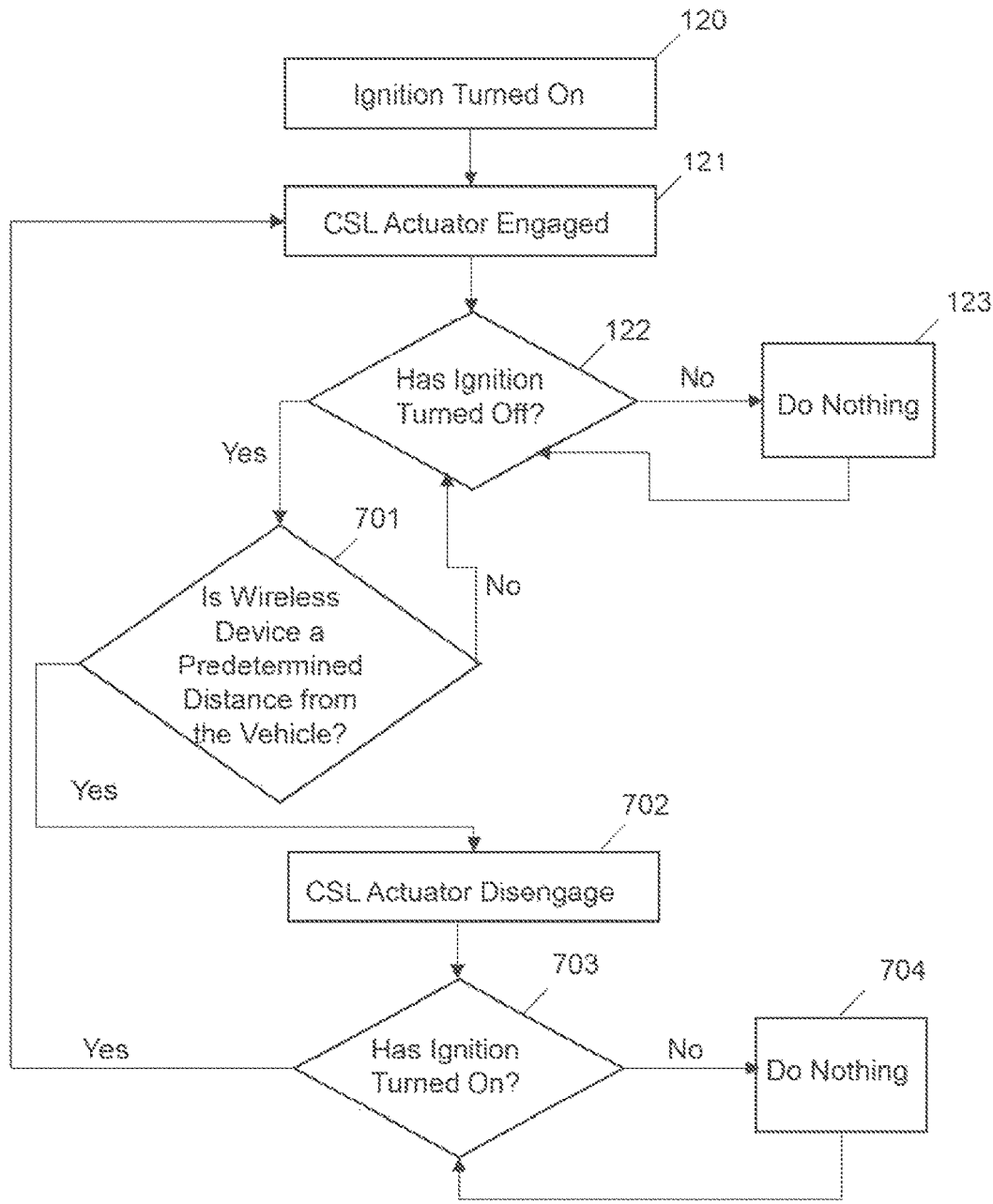
FIG. 7 is a decision box diagram of an automated child safety unlocking system in accordance with the present invention.

Referring now to FIG. 7, a decision box diagram showing details concerning an operation routine of the system 500 is shown. Upon a vehicle turn on step 120, the vehicle ignition is turned on and the child safely lock actuator 105 is engaged 121. At decision step 122 "Has Ignition Turned Off," the system determines if the ignition has been turned off. This determination may be made by an ECU as described above. If at decision step 122 it is determined that the ignition has not been turned off, then the child safety lock ECU or other control unit will move to a "do nothing" step 123 and take no action to disengage the child safety lock actuator. The system will continue to cycle back to the decision step 122 at programmed intervals or upon receipt of more information by the electronic control system until at the decision step 122 a determination that the ignition has turned off. If the system determines that the ignition has turned off, then at decision step 701 "Is Wireless Device a Predetermined Distance from the Vehicle," the system determines if the wireless device has traveled a predetermined distance from the vehicle. If at decision step 701 it is determined that the wireless device has not traveled a predetermined distance from the vehicle, then the child safety lock ECU or other control unit will move back to the decision step 122 to determine if the ignition has been turned off. If the system determined that the ignition has turned off, then at decision step 701, if the system determines that the wireless device has traveled a predetermined distance from the vehicle, the child safety lock actuator will be commanded to disengage 702.

After the child safety lock actuator is disengaged, at decision step 703 "Has Ignition Turned ON," the system determines if the ignition has been turned on. This determination may be made by an ECU as described above. If at decision step 703 it is determined that the ignition has not been turned on, then the child safety lock ECU or other control unit will move to a "do nothing" step 704 and take no action to engage the child safety lock actuator. The system will continue to cycle back to the decision step 703 at programmed intervals or upon receipt of more information by the electronic control system until at the decision step 703 a determination that the ignition has turned on. If the system determines that the ignition has turned on, then at step 121, the child safety lock actuator is commanded to engage.

In another embodiment of the invention, upon the child safety lock actuator 105 being disengaged, an audible, visual or audible and visual alarm may notify the occupant of the vehicle or another individual near a wireless key fob that the child safety lock has been released. The notification also alerting another individual at a location away from the vehicle that there is an individual trapped inside the vehicle. It is also anticipated that the system may send a notification to a mobile telephone, email server, or other communication device alerting an individual that a person is trapped in the vehicle. The notification thereby alerting the occupant that said occupant is now able to exit the locked vehicle.

In another embodiment of the invention other vehicle sensors may be used to signal the child safety lock actuator to disengage. For example, an occupant sensor may detect that there is an occupant in the vehicle AND a trouble sensor such as a temperature sensor, Carbon Monoxide sensor, CO2 Sensor, Smoke Sensor, or other type of safety sensor detects trouble, a notification may immediately sound and the child safety lock actuator automatically disengages thereby allowing any occupant of the vehicle to operate the door handle of a door equipped with a child safety lock. Upon the child safety lock actuator 105 being disengaged, an audible, visual or audible and visual alarm may notify the occupant of the vehicle or another individual near a wireless key fob that the child safety lock has been released. The notification thereby alerting the occupant that said occupant is now able to exit the vehicle. The notification also alerting another individual at a location away from the vehicle that there is an individual trapped inside the vehicle. It is also anticipated that the system may send a notification to a mobile telephone, email server, or other communication device alerting an individual that a person is trapped in the vehicle.

It is also envisioned that if a child is trapped in a vehicle, the car doors need to be unlocked from both the inside and outside. However, it is still a desire to prevent the exterior doors from being unlocked UNLESS someone is trapped inside. It is further envisioned that if the ignition is turned off, as described above, AND motion is detected inside the vehicle, the interior and exterior doors may be unlocked to allow the trapped person to escape from the vehicle from the inside and to allow someone to open the door from the exterior of the vehicle to allow the trapped person to escape from the vehicle. It is envisioned that the technology disclosed in U.S. Pat. No. 6,577,228 could be used to accomplish this for the inside door handle. More specifically, similar to the technology disclosed in U.S. Pat. No. 6,577,228, when a human hand touches the INTERIOR handle of the vehicle, a stray capacitance of a transmitting antenna would increase so that the current flowing through the antenna momentarily changes and a current defecting circuit detects a contact of a human hand to the handle and supplies a detection signal to an ECU. This technology could be used with the present invention as shown in FIGS. 8 and 9.

Figure 8:
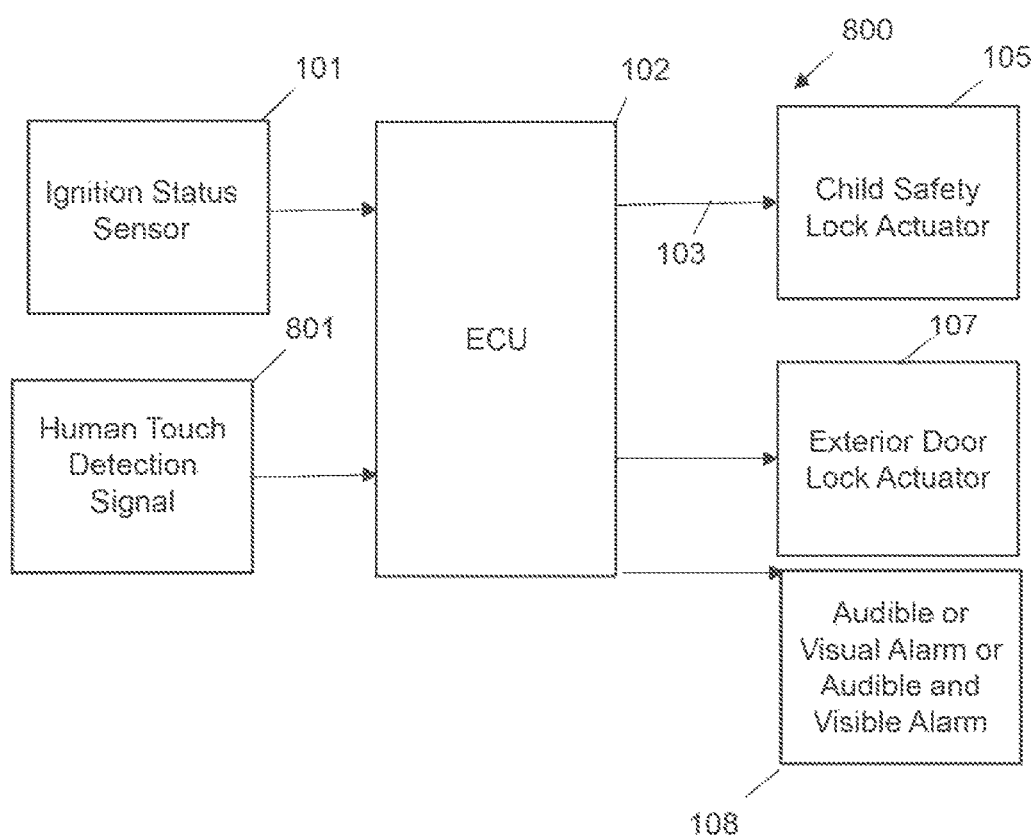
FIG. 8 is a general schematic diagram of an automated child safety unlocking system in accordance with one embodiment of the invention.

Referring now to FIG. 8, a schematic diagram of an automated child safety unlocking system 800 is shown. If the vehicle ignition is turned off AND a human hand touches the INTERIOR door handle, the vehicle status signal 101 and the human touch detection signal 801 as disclosed U.S. Pat. No. 6,577,228 are sent to the ECU 102. The ECU 102 may then selectively disengage a child safety lock actuator 105 in response to the child safety lock command signal 103 received by the ECU 102. The ECU 102 or a separate control unit may then send a control signal to an actuator 107 to unlock the exterior door handle. It should be noted that the actuators 105 and 107 may be separate actuators or may be a single actuator configured to disengage the child lock and to unlock the exterior door handle. It should also be noted that, if the actuators 105 and 107 are separate actuators, they may be controlled by the same control unit or by separate control units. Additionally, If the vehicle ignition is turned off AND a human hand touches the INTERIOR door handle, these signals 101 and 801 are sent to a control system that commands an audible or visible or audible and visible alarm 108 in the vehicle, on a wireless key fob, or at a separate communication device such as a mobile phone. It should also be noted that the human hand detection signal could be replaced by a motion detection signal. The alarm and/or notifications will alert a person that someone is trapped inside the car. Again, the alarm or notification may be controlled by the same control unit or different control unit that controls the actuators 105 and 107.

Figure 9:
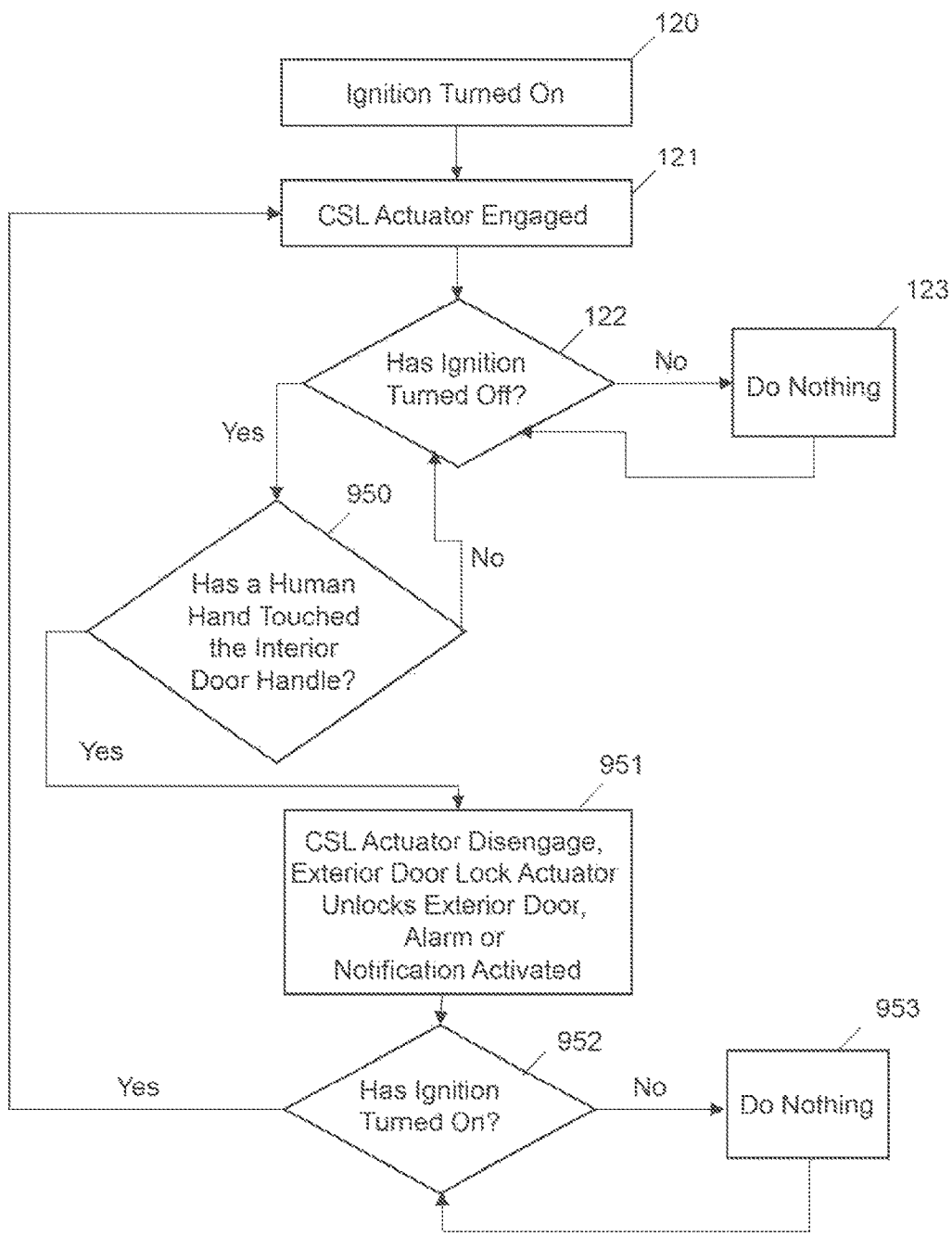
FIG. 9 is a decision box diagram of an automated child safety unlocking system in accordance with the present invention.

Referring now to FIG. 9, a decision box diagram showing details concerning an operation routine of the system 800 is shown. Upon a vehicle turn on step 120, the vehicle ignition is turned on and the child safety lock actuator 105 is engaged 121. At decision step 122 "Has Ignition Turned Off," the system determines if the ignition has been turned off. This determination may be made by an ECU as described above. If at decision step 122 it is determined that the ignition has not been turned off, then the child safety lock ECU or other control unit will move to a "do nothing" step 123 and take no action to disengage the child safety lock actuator. The system will continue to cycle back to the decision step 122 at programmed intervals or upon receipt of more information by the electronic control system until at the decision step 122 a determination that the ignition has turned off. If the system determines that the ignition has turned off, then at decision step 950 "Has a Human Hand Touched the Interior Door Handle," the system determines if a human hand has touched the interior door handle. If at decision step 950 it is determined that a human hand has NOT touched the interior door handle, then the child safety lock ECU or other control unit will move back to the decision step 122 to determine if the ignition has been turned off. If the system determined that the ignition has turned off, then at decision step 950, if the system determines that a human hand has touched the interior door handle, the child safety lock actuator will be commanded to disengage at step 951. Also at step 951, an exterior door lock actuator could be commanded to unlock the exterior door handle and an audible or visible or audible and visible alarm or notification could be activated at the vehicle, a wireless fob is then, or a communication device such as a mobile phone. It should also be noted that step 950 "Has a Human Hand Touched the Interior Door Handle;" could instead be a step for determining "Has Motion Been defected in the interior of the vehicle?"

After the child safety lock actuator is disengaged, at decision step 952 "Has Ignition Turned ON," the system determines if the ignition has been turned on. This determination may be made by an ECU as described above. If at decision step 952 it is determined that the ignition has not been turned on, then the child safety lock ECU or other control unit will move to a "do nothing" step 953 and take no action to engage the child safety lock actuator. The system will continue to cycle back to the decision step 952 at programmed intervals or upon receipt of more information by the electronic control system until at the decision step 952 a determination that the ignition has turned on. If the system determines that the ignition has turned on, then at step 121, the child safety lock actuator is commanded to engage.

Figure 10:
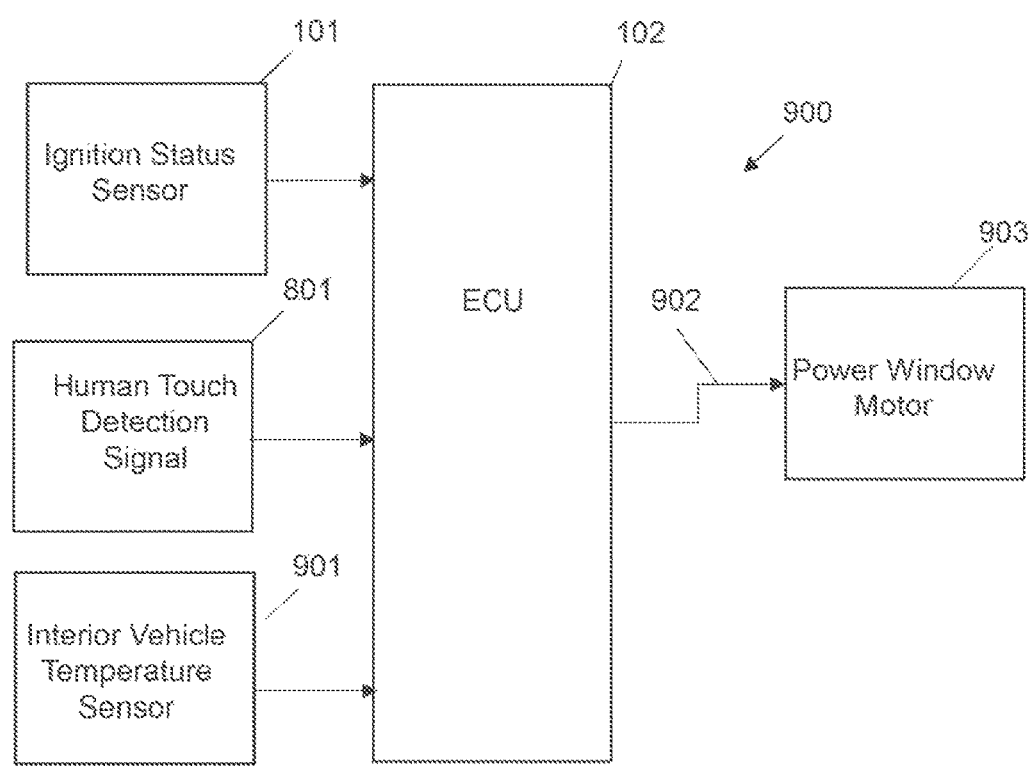
FIG. 10 is a general schematic diagram of an automated window lowering, child safety system in accordance with one embodiment of the invention.

Referring now to FIG. 10, a schematic diagram of an automated child safety unlocking system 900 is shown. If the vehicle ignition is turned off, the interior temperature of the vehicle reaches a threshold value, AND a human band touches the INTERIOR door handle, the vehicle status signal 101, the detection signal 801 and the interior vehicle temperature sensor 901 are sent to the ECU 102. The ECU 102 is configured to then transmit a window lowering command signal 902 to the power window motor 903, which optionally moves the window glass to an opening direction (down) or closing direction (up). In this embodiment, the power window motor may be controlled by the same ECU that receives the signals 101, 801 and 901 or may be controlled by a different control unit. Similar to the system depicted in FIG. 8 and FIG. 9, the embodiment depicted in FIG. 10 may also include the disengagement of the child safety lock, the activation of an alarm, and/or the unlocking of the exterior door handle in the event that the vehicle ignition is turned off, the interior temperature of the vehicle reaches a threshold value, AND a human hand touches the INTERIOR door handle.

Figure 11:
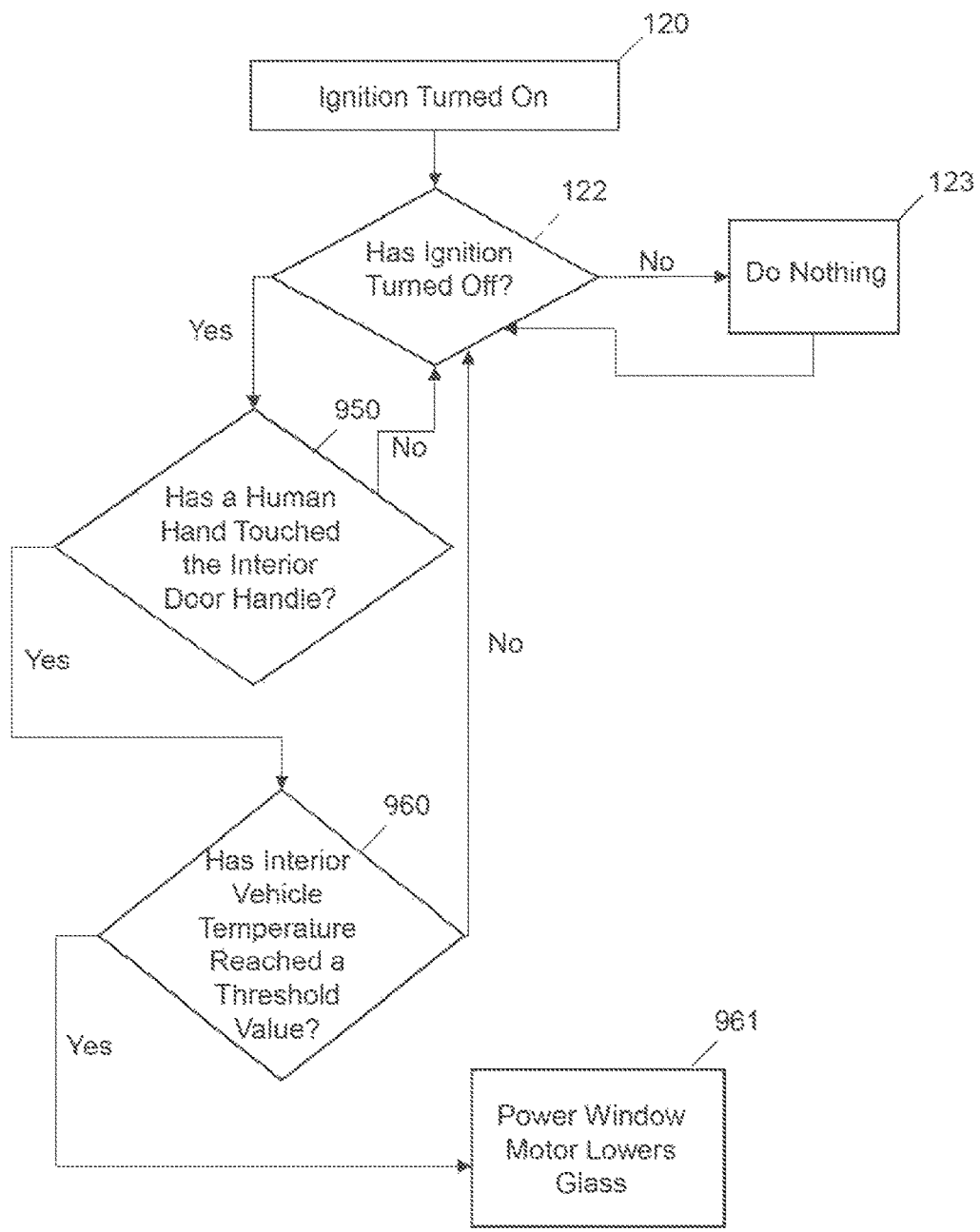
FIG. 11 is a decision box diagram of an automated window lowering child safety system in accordance with the present invention.

Referring to FIG. 11, a decision box diagram showing details concerning an operation routine of the system 900 is disclosed. Upon a vehicle turn on step 120, the vehicle ignition is turned on. At decision step 122 "Has Ignition Turned Off," the system determines if the ignition has been turned off. This determination may be made by an ECU as described above. If at decision step 122 it is determined that the ignition has not been turned off then the child safety lock ECU or other control unit will move to a "do nothing" step 123 and take no action to move the window glass to an opening direction. The system will continue to cycle back to the decision step 122 at programmed intervals or upon receipt of more information by the electronic control system until at the decision step 122 a determination that the ignition has turned off. If the system determines that the ignition has turned off, then at decision step 950 "Has a Human Hand Touched the Interior Door Handle," the system determines if a human hand has touched the interior door handle. If at decision step 950 it is determined that a human hand has NOT touched the interior door handle, then the ECU or other control unit will move back to the decision step 122 to determine if the ignition has been turned off. If the system determined that the ignition has turned off, then at decision step 950, if the system determines that a human hand has touched the interior door handle, then at decision step 960, "Has Interior Vehicle Temperature Reached Threshold Value," the system determines if the interior temperature of the car has reached some predetermined threshold value. If at decision step 960 it is determined that the interior temperature of the car has NOT reached some predetermined threshold value, then the ECU or other control unit will move back to decision step 122 to determine if the ignition has been turned off. If the system determines that the ignition has been turned off and that a human hand has touched an interior door handle and the interior vehicle temperature has reached the threshold value, then the power window motor moves the window glass into an opening position 961. Similar to the system depicted in FIG. 8 and FIG. 9, the embodiment depicted in FIG. 11 may also include the disengagement of the child safety lock, the activation of an alarm, and/or the unlocking of the exterior door handle in the event that the vehicle ignition is turned off, the interior temperature of the vehicle reaches a threshold value, AND a human hand touches the INTERIOR door handle. It should be noted that any step or signal referring to a human hand touching an interior door handle could be replaced with a motion detector or any sensor determining that a person or animal is inside the vehicle.

If desired, after the power window motor moves the window glass into an open position, the system may perform a similar function as shown at the bottom of FIG. 9 and close the window when the ignition is turned back on.

While several embodiments of the present invention have been disclosed hereinabove, it is to he understood that these embodiments are given by example only and not in a limiting sense. Those skilled in the art may make various modifications and additions to the preferred embodiments chosen to illustrate the invention without departing from the spirit and scope of the present contribution to the art. Accordingly, it is to be realized that the patent protection sought and to be afforded hereby shall be deemed to extend to the subject matter claimed and all equivalence thereof fairly within the scope of the invention.

What is claimed is:

1. An automated child safety control system for controlling a child safety lock device of a motor vehicle, said motor vehicle having rear inside door handles and rear outside door handles, said system comprising:
   a control device for controlling said child safety lock device between a first operating position in which said child safety lock device allows the rear doors of said motor vehicle to be opened using said rear inside door handles and using said rear outside door handles and a second operating position establishing a child safety lock mode in which said child safety lock device does not allow said rear doors to be opened using said rear inside door handles but still allows said rear doors to be opened using said rear outside door handles;
   a vehicle status detection sensor configured to detect whether said motor vehicle is turned on or turned off;
   wherein said control device is configured to control said child safety lock device to said first operating position in response to a first signal received from said vehicle status detection sensor indicating that said motor vehicle is turned off; and
   wherein said control device is further configured to control said child safety lock device to said second operating position in response to a second signal received from said vehicle status detection sensor indicating that said motor vehicle is turned on.

2. The automated child safety control system of claim 1, wherein the system is programmed to control said child safety lock device to said first operating position some delay time after said control device receives said first signal from said vehicle status detection sensor indicating that said motor vehicle is turned off.

3. The automated child safety control system of claim 1, further comprising:
   an alarm providing an audible or visual warning or an audible and visual warning when the system is used to control said child safety lock device to said first operating position.

4. The automated child safety control system of claim 1, further comprising:
   a manually activated temporary consent function for temporarily controlling said child safety lock device to said second operating position.

5. An automated child safety control system for controlling a child safety lock device of a motor vehicle, said motor vehicle having rear inside door handles and rear outside door handles, said system comprising:
   a control device for controlling said child safety lock device between a first operating position in which said child safety lock device allows the rear doors of said motor vehicle to be opened using said rear inside door handles and using said rear outside door handles and a second operating position establishing a child safety lock mode in which said child safety lock device does not allow said rear doors to be opened using said rear inside door handles but still allows said rear doors to be opened using said rear outside door handles;
   a wireless device detection sensor configured to detect whether a wireless device has moved a predetermined distance from said motor vehicle;
   a vehicle status detection sensor configured to detect whether said motor vehicle is turned on or turned off;
   wherein said control device is configured to control said child safety lock device to said first operating position in response to a first signal received from said wireless device detection sensor indicating that said wireless device has moved a predetermined distance form said motor vehicle and a second signal received from said vehicle status detection sensor indicating that said motor vehicle is turned off; and
   wherein said control device is configured to control said child safety lock device to said second operating position in response to a third signal received from said vehicle status detection sensor indicating that the motor vehicle is turned on.

6. The automated child safety control system of claim 5, wherein the wireless device uses near field communications.

7. The automated child safety control system of claim 5, wherein the system is programmed to control said child safety lock device to said first operating position some delay time after said control device receives said first and second signals from said vehicle status detection sensor and wireless device detection sensor.

8. The automated child safety control system of claim 5, further comprising:
   an alarm providing an audible or visual warning or an audible and visual warning when the system is used to control said child safety lock device to said first operating position.

9. The automated child safety control system of claim 5, further comprising:
   a manually activated temporary consent function for temporarily controlling said child safety lock device to said second operating position.

10. An automated child safety control system for controlling a child safety lock device of a motor vehicle, said motor vehicle having rear inside door handles and rear outside door handles, said system comprising:
    a control device for controlling said child safety lock device between a first operating position in which said child safety lock device allows the rear doors of said motor vehicle to be opened using said rear inside door handles and using said rear outside door handles and a second operating position establishing a child safety lock mode in which said child safety lock device does not allow said rear doors to be opened using said rear inside door handles but still allows said rear doors to be opened using said rear outside door handles;
    a vehicle occupant detection sensor configured to detect whether an occupant is in the interior of said motor vehicle;
    a vehicle status detection sensor configured to detect whether said motor vehicle is turned on or turned off;
    wherein said control device is configured to control said child safety lock device to said first operating position in response to a first signal received from said vehicle occupant detection sensor indicating that there is an occupant in the interior of the motor vehicle and a second signal received from said vehicle status detection sensor indicating that said motor vehicle is turned off; and
    wherein said control device is further configured to control said child safety lock device to said second operating position in response to a third signal received from said vehicle status detection sensor indicating that the motor vehicle is turned on.

11. The automated child safety control system of claim 10, further comprising:
an interior vehicle temperature detection sensor configured to detect the interior temperature of said motor vehicle;
a window control device;
wherein said window control device is used to move the motor vehicle's window glass to an opening direction in response to a third signal received from said vehicle occupant detection sensor indicating that there is an occupant in the interior of said motor vehicle and a fourth signal from said interior vehicle temperature detection sensor indicating that the interior vehicle temperature has reach a set limit.

12. The automated child safety control system of claim 10, wherein the system is programmed to control said child safety lock device to said first operating position some delay time after said control device receives said first and second signals from said vehicle status detection sensor and vehicle occupant detection sensor.

13. The automated child safety control system of claim 10, further comprising:
an alarm providing an audible or visual warning or an audible and visual warning when the system is used to control said child safety lock device to said first operating position.

14. The automated child safety control system of claim 10, further comprising:
a manually activated temporary consent function for temporarily controlling said child safety lock device to said second operating position.

15. The automated child safety control system of claim 10 wherein the vehicle occupant detection sensor is a human touch detection sensor that is configured to detect whether a human hand has touched one or more of said rear inside door handles of the vehicle.

16. The automated child safety control system of claim 10 wherein the vehicle occupant detection sensor is a motion sensor configured to detect motion in the interior of the vehicle.

* * * * *